United States Patent [19]

Deming et al.

[11] 4,103,238
[45] Jul. 25, 1978

[54] TRANSMITTER MODULATED WITH THREE MODULATION PATTERNS

[75] Inventors: Andrew F. Deming, Alliance, Ohio; James B. Russell, Glenshaw, Pa.

[73] Assignee: The Alliance Manufacturing Company, Alliance, Ohio

[21] Appl. No.: 744,976

[22] Filed: Nov. 26, 1976

[51] Int. Cl.² ............................................. H04B 1/04
[52] U.S. Cl. .................... 325/141; 325/139; 343/225; 340/365 R
[58] Field of Search ............ 325/37, 39, 40, 55, 325/64, 141, 143, 183, 139; 340/167 R, 171 R, 171 A, 171 PF, 348, 349, 351, 365 R, 365 S; 343/225-227; 179/15 BA, 15 AN, 84 SS

[56] References Cited

U.S. PATENT DOCUMENTS

| | | | |
|---|---|---|---|
| 3,403,381 | 9/1968 | Haner | 325/55 |
| 3,510,777 | 5/1970 | Gordon | 325/55 |
| 3,648,174 | 3/1972 | Fukata | 325/55 |
| 3,731,200 | 5/1973 | Schwendeman et al. | 325/55 |
| 3,835,454 | 9/1974 | Palmieri et al. | 325/37 |
| 3,906,348 | 9/1975 | Willmott | 325/37 |
| 4,005,428 | 1/1977 | Graham | 325/37 |

Primary Examiner—Robert L. Griffin
Assistant Examiner—Jin F. Ng
Attorney, Agent, or Firm—Woodling, Krost, Granger & Rust

[57] ABSTRACT

An encoding transmitter is disclosed which includes a modulator providing a means to modulate a carrier wave selectively with a first or a second modulation frequency or pattern to provide first and second modulation patterns respectively. Also a third modulation pattern may be established by providing successive portions of the first modulation frequency and the second modulation frequency during a given time period. A data selector is controlled by data select control signals which are obtained from a counter counting from the first modulation frequency signal. Programmable means include a multi-position switch to program the input channels of the data selector so as to control whether the first or the third modulation pattern is that which modulates the carrier wave during any given unit of time.

23 Claims, 4 Drawing Figures

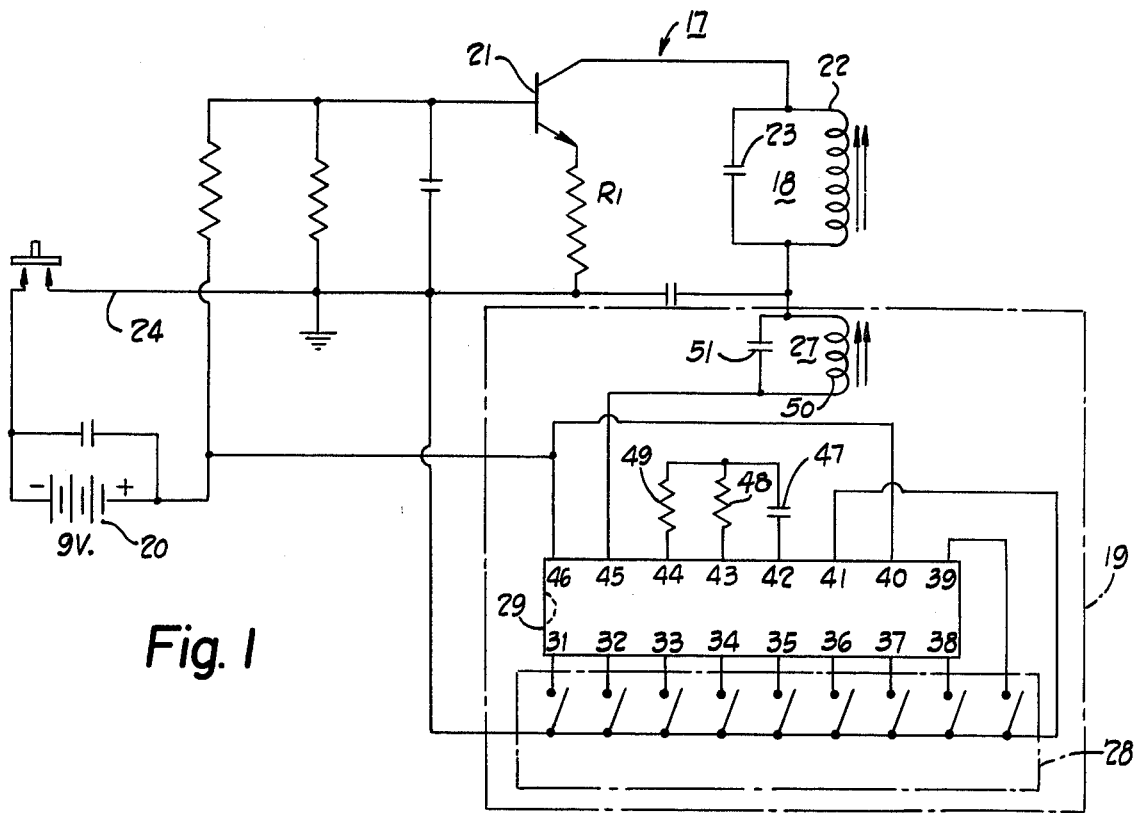
Fig. 1
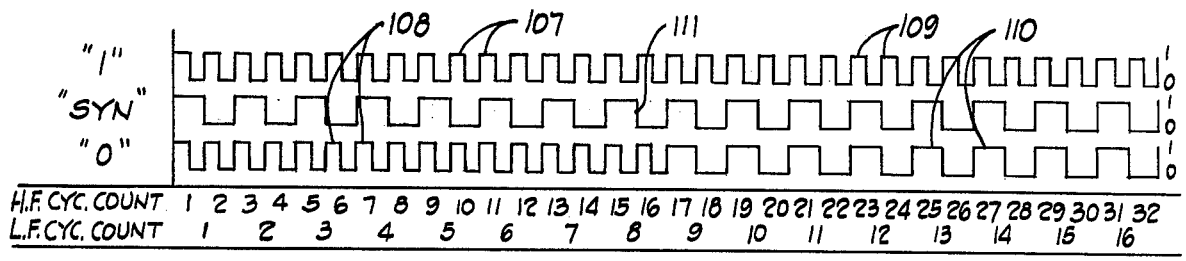
Fig. 2
| | INTERNALLY PROGRAMMED | | | | | | | EXTERNALLY PROGRAMMED | | | | | | | | |
|---|---|---|---|---|---|---|---|---|---|---|---|---|---|---|---|---|
| MODULATION PATTERN SEQUENCE | 14 | 15 | 0 | 1 | 2 | 3 | 4 | 5 | 6 | 7 | 8 | 9 | 10 | 11 | 12 | 13 |
| LOGIC STATE | 1 | SYNC | 1 | 0 | 1 | 1 | 0 | 1 OR 0 | 1 OR 0 | 1 OR 0 | 1 OR 0 | 1 OR 0 | 1 OR 0 | 1 OR 0 | 1 OR 0 | 1 OR 0 |
Fig. 3

TRANSMITTER MODULATED WITH THREE MODULATION PATTERNS

BACKGROUND OF THE INVENTION

Many transmitters have been used to transmit a modulation signal with both amplitude modulation and frequency modulation. In remote control transmitters a signal has been sent by the transmitter to a remotely positioned receiver which receives the signal, if of proper carrier frequency and then if the modulation frequency is also in agreement with that of the receiver the receiver will energize a relay. This may be used in the remote control of a load at the receiver location, for example, a garage door operator to open and close a garage door. With the increasing numbers of radio controlled garage doors now in the United States there are many occasions when the number of codes provided by different carrier frequencies and modulation frequencies is insufficient. There may be interference between two closely adjacent receivers wherein a strong signal from a closely positioned transmitter can energize a relay in a receiver even when the carrier and modulation frequencies in the transmitter and receiver are not the same. A prior art solution was the provision of two modulation frequencies both modulating the carrier at the same time with the receiver on the same code having three different frequencies, namely the carrier and the two modulations frequencies in order to respond to such transmitted signal. Due to the limitations of frequencies available for the carrier frequency and frequencies available for the modulation frequencies which are not integral multiples, i.e. harmonics of one another, the number of possible codes is limited to two or three hundred. Often this is insufficient to prevent unwanted actuation of the incorrect receiver and thus the opening of a garage door other than the one intended.

One prior art solution was the utilization of neither pure amplitude nor frequency modulation but instead a transmission of a carrier wave turned on and off by a digital signal. First and second digital signals of a ratio of frequencies were utilized which were in phase agreement and were combined to provide either a short pulse or a long pulse so that a pulse train of varying pulse widths was used to modulate a carrier wave. A synchronization period of the carrier with an absence of pulses was then transmitted to indicate that this was the end of the message. The message was then repeated continuously by the transmitter. If the receiver was on the same code, that is, the same carrier frequency and the same sequence of narrow and wide pulses, then the receiver would be enabled and the remotely controlled load, e.g. a garage door opener would be actuated. These prior attempts at encoding transmitters are deficient in the number of codes to be transmitted. The digital control system has the deficiencies of relying upon the complexity of a shift register into which a particular digital pulse pattern was loaded and then serially supplied to an output so as to be provided as a modulation signal on the carrier wave. This system has no preamble pulse pattern to assure exclusivity of the transmitted signal.

SUMMARY OF THE INVENTION

The invention may be incorporated in a transmitter comprising in combination, a carrier generator to generate a carrier wave, means establishing first and second different modulation frequency signals, means establishing time sequential control signals, modulation means to modulate said carrier wave by said first and second modulation signals in first, second and third modulation patterns comprising first means to modulate said carrier wave with said first modulation signal in accordance with said sequential control signals, second means to modulate said carrier wave with said second modulation signal in accordance with said sequential control signals, and third means to alternate the modulation of said carrier wave with said first modulation signal and said second modulation signal in accordance with said sequential control signals.

An object of the invention is to provide a transmitter wherein selectively first and second modulation signals modulate a transmitter carrier wave in accordance with programmable switch means.

Another object of the invention is to provide an encoding transmitter utilizing only first and second modulation signals to establish first, second and third modulation patterns on a carrier wave with the pattern a logic one, a logic zero and a synchronization pattern.

Another object of the invention is to provide a time sequence multiplexer to supply data from a programmable switch to a data selector and controlling modulation of first and second modulation signals on a carrier wave.

Another object of the invention is to provide a very large number of transmitted code patterns for a greater exclusivity of the transmitted signal.

Other objects and a fuller understanding of the invention may be had by referring to the following description and claims, taken in conjunction with the accompanying drawings.

BRIEF DESCRIPTION OF THE DRAWINGS

FIG. 1 is a schematic diagram of a transmitter according to the invention;

FIG. 2 is a diagram of the modulation patterns on the carrier wave;

FIG. 3 is a chart of possible programming sequences of modulation patterns; and

DESCRIPTION OF THE PREFERRED EMBODIMENT

Figure 4:
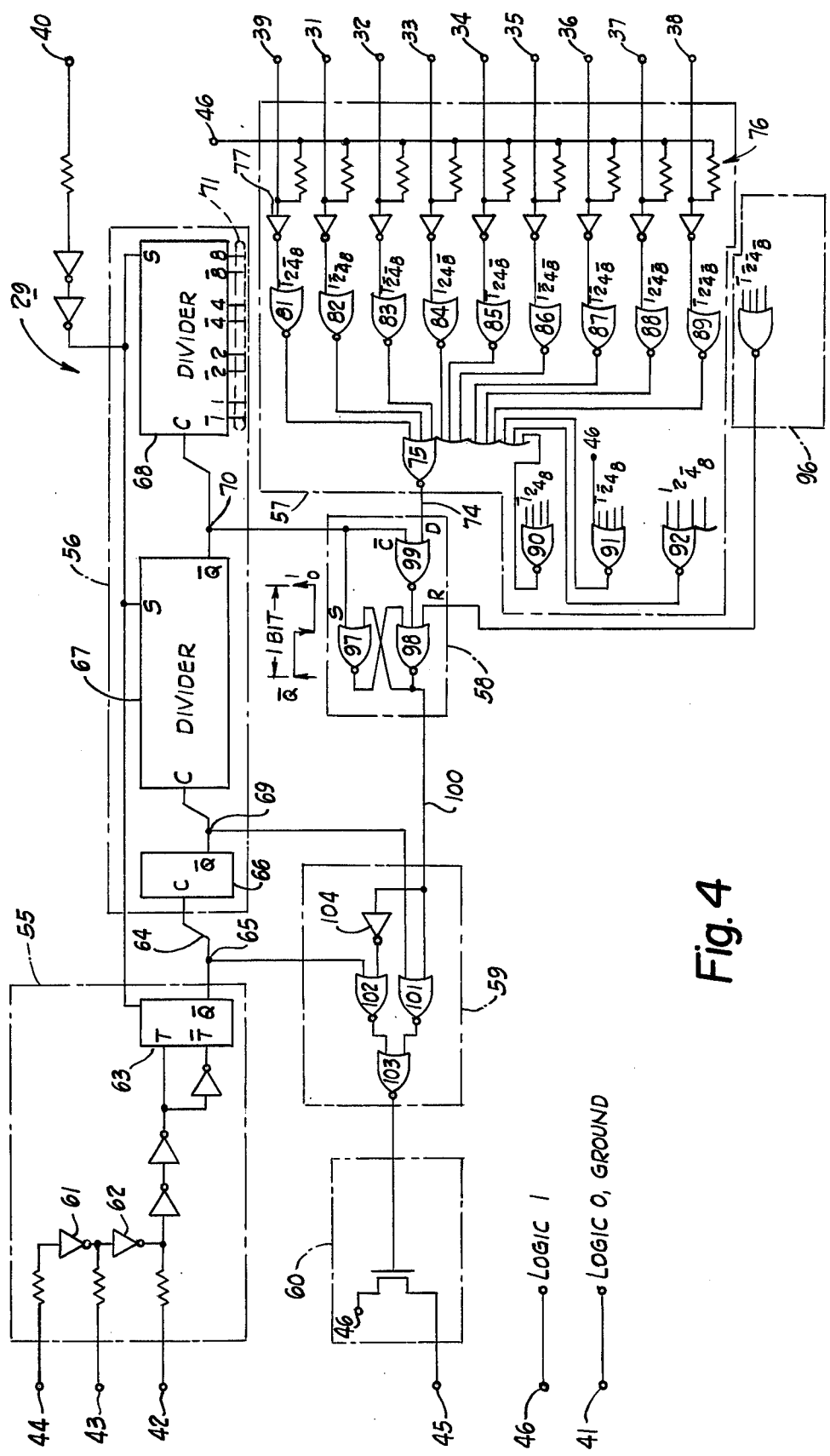
FIG. 4 is a schematic diagram of the modulator of the transmitter of FIG. 1.

FIG. 1 is a schematic diagram of a transmitter 17 which includes generally a carrier generator 18, a modulator or encoder 19 and a power source 20. The carrier generator 18 includes an amplifier 21 shown as a transistor and connected as an oscillator utilizing a parallel resonant circuit of an inductance 22 and capacitance 23 connected in the collector to emitter circuit of the transistor 21. The transmitter 17 is a negative ground circuit and may be mounted on a printed circuit board with the negative of the battery or power source 20 connected to this ground 24. In one transmitter built in accordance with the present invention the oscillator operated in the 300 megahertz range and the capacitance 23 was about 3 picofarads. The inductance 22 was a suitable size to be resonant to this 300 megahertz frequency range.

The modulator 19 includes generally a broad banding circuit 27, a programmable means 28 and a digital circuit 29. The programmable means 28 may take the form of jumpers which may be cut, a changeable mask connection, or as shown, may be a switch of many types. The digital circuit contains the digital circuit components in the modulator 19 and is controlled by the programmable means or switch 28 as a means to program a desired modulation pattern of the carrier wave generated by the carrier generator 18. This circuit 29 may be made from discrete components but since the circuit operates at low power level it conveniently may also be made as an integrated circuit. Such circuit has 16 terminals numbered consecutively as reference numerals 31–46. In a preferred embodiment a p-mos device was used as a specific implementation of the invention. The programmable switch 28 has a plurality of poles of single throw construction and in this preferred embodiment there are nine poles to the switch 28. These nine poles are connected to the integrated circuit terminals 31–39, respectively. Terminal 40 is a test terminal, and terminal 41 is the ground of the transmitter 17. Terminal 42 is connected to an external capacitor 47 and terminals 43 and 44 are connected to external resistors 48 and 49, respectively. The selection of the values of these resistors and the capacitor establishes a frequency from which the modulation of the circuit 29, is derived. The broad banding circuit 27 includes a parallel resonant circuit comprising an inductance 50 and a capacitance 51 to be resonant in the range of the modulation frequencies, as set forth below. One end of this parallel resonant circuit 27 is connected to the parallel resonant circuit 22, 23 to series modulate the transmitted carrier wave. The modulation output of the circuit 29 is supplied to the broad banding circuit 27 at an output terminal 45.

The digital circuit 29 is shown schematically in FIG. 4 and the numerals 31–46 are shown around the perimeter as the 16 terminals of this digital circuit 29. The digital circuit 29 includes generally an oscillator 55, a counter 56, a data selector 57, an output decoder 58, output selector means 59, and an output driver 60. The oscillator 55 is a means to establish the first modulation frequency signal and may be an oscillator of many different types but as shown includes the inverters 61 and 62 connected as an astable multivibrator circuit with the frequency controlled by the external resistors 48 and 49 and capacitor 47, shown on FIG. 1. These components set the oscillating frequency and merely by way of example, in an operating circuit constructed according to the invention, this was approximately 40 Khz. The output of the oscillator inverters 61 and 62 is connected through two buffer inverters to a flip-flop 63. This flip-flop 63 halves the frequency and makes a square wave out of the signal so that a square wave is delivered on the output conductor 65.

The output conductor 65 supplies an input to the output selector means 59 and also to the C or clock input of a first divider 66 within the counter 56. The counter 56 in addition to the first divider 66 includes a second divider 67 and a third divider 68.

The first divider 66 is a divider to divide by X where X is any number so that the second audio frequency, generated on the $\overline{Q}$ output at a conductor 69 is 1/X times the frequency of the first audio frequency on terminal 65. This second audio frequency signal or second modulation frequency signal is also supplied to the output selector means 59.

The second divider 67 may divide by any desired number Y such that the output of the divider 67 produces a bit signal which is 1/Y times the frequency of the second audio frequency signal at terminal 69. The bit signal appears on the $\overline{Q}$ output at a terminal 70 and is applied at a set input terminal S of the output decoder 58, as well as being applied to the clock or C input of the third divider 68. Divider 68 may divide by any desired number Z such that the divider 68 produces a word signal which is 1/Z times the frequency of the bit signal at terminal 70. The divider 68 has a plurality of output states. In one particular embodiment of the invention as actually constructed, Z was 16 supplied as a binary signal on four pairs of data select control signal terminals 71. With 16 output states this means that the divider was a divide by 16 divider and with the binary output being supplied on the signal terminals 71 designated as $\overline{1}$, 1, $\overline{2}$, 2, $\overline{4}$, 4, $\overline{8}$ and 8. By simple combination of these outputs any one of 16 output states may be obtained.

The signal terminals 71 of the counter 56 are connected to the data selector 57, but the actual conductor connections have been omitted from FIG. 4 as being too confusing. Instead, on the various gates of the data selector 57 the various binary outputs have merely been labeled as inputs. The data selector 57 may be considered a time sequence multiplexer providing an output on a terminal 74 to the output decoder 58.

As stated above, the data select control signal terminals 71 are connected to the data selector 57 in order to control this data selector in a time sequential manner. The data input to the data selector 57 is from the multiple pole programmable switch 28, shown in FIG. 1. The switch terminals are connected to the digital circuit terminals 31–39. The data selector 57 includes an output gate 75 which is a multiple input gate with inputs at least equal in number to the number of poles on the programmable switch 28. This gate 75, as shown, may be a NOR gate. The inputs to this gate 75 come from gates 81–89 connected respectively to the terminals 31–39 on one of the inputs thereof. Each of these gates 81–89 is a five input gate and four inputs are not shown by connector lines but instead are indicated by the particular binary output as obtained from the divider 68 of the counter 56, with this binary value being either $\overline{1}$, 1, $\overline{2}$, 2, $\overline{4}$, 4, $\overline{8}$ and 8. The fifth input of each gate is connected through its respective inverter 77 to its respective terminal 31–39.

From FIG. 1 it will be noted that when a particular pole of the programmable switch 28 is closed, then the respective input terminal 31–39 will be connected to the transmitter ground 24. This programs a logic one condition into the data selector through inverter 77. The various gates and dividers of the digital circuit 29 may be constructed in many different ways and may include FET transistors with source and drain voltages applied at the terminals 46 and 41, respectively.

When the respective switch pole, on terminal 39 for example, is closed, this terminal is connected to ground for a logic zero condition, programming a logic one into the gate 81 through the respective inverter 77. When the switch is open this input to the respective gate 81 for example, is a logic zero condition because of a pull up resistor 76 and inverter 77.

The data selector 57 may include one or more gates 90, 91 and 92 which are a part of the programmable means but are not connected to the programmable switch 28. These gates 90–92 are used for programming the preamble and have inputs connected to the data select control signal terminals 71. These gates 90–92 may be considered internally programmable rather than externally programmable, for example, at the time of manufacture of the digital circuit 29. The gates 90–92 have outputs connected to the input of the gate 75.

A synchronization bit decoder 96 is a four input NOR gate having inputs connected to the appropriate data select control signal terminals 71 to decode one count of the Z output states. In the particular embodiment shown this decodes the count of 15 or the last of the 16 output states of the divider 68. This may be at the end of the word. The sync bit decoder 96 supplies a signal to a reset terminal R of the output decoder 58.

The output decoder 58 includes gates 97 and 98 cross connected as an R-S flip-flop with one input of gate 97 being connected to the bit signal terminal 70 as a set input of the output decoder 58. This decoder 58 also includes a gate 99 having one input connected to the terminal 70 as an inverse clocking input $\overline{C}$, and another input as a data input D from the data selector 57 on conductor 74. The output from the gate 98 is the Q output of this output decoder 58. This appears on a terminal 100 and is applied to the output selector means 59. This output selector means has gates 101, 102 and 103 connected as a form of data multiplexer. Gates 101 and 102 supply the two inputs to gate 103. Terminal 100 is connected to one input of gate 101 and is connected through an inverter 104 to an input of gate 102. The first modulation frequency signal at terminal 65 is connected to an input of gate 102 and the second modulation frequency signal at terminal 69 is connected to an input of gate 101. Gate 103 supplies the output of the output selector means 59 and applies it to the output driver 60. This may consist simply of one or two inverters or driving transistors to supply a buffered signal to the output terminal 45.

Operation

The transmitter of FIG. 1 operates as an encoding transmitter to transmit a carrier wave modulated by digital information which is provided in first, second and third modulation patterns and a specific illustration of a pattern is now described. The first pattern is 2Y, (32), cycles of the first modulation frequency. This may be considered a logic one bit. The second modulation pattern is represented by 16 cycles of the second modulation frequency. This may be considered a synchronization bit and is used to signify the beginning of a word. The third modulation pattern is represented by Y, (16), cycles of the first modulation frequency followed directly by Y/2, (8), cycles of the second modulation frequency. This may be considered a logic zero bit. These three bits are shown in FIG. 2.

These logic one and logic zero bits are sent in a word of Z bits in length which, in the preferred embodiment shown, is 16 bits. The first modulation frequency at the terminal 65 may be any desired frequency in the low audio or super audio range as an example. In one transmitter manufactured in accordance with the invention the oscillator 61, 62 oscillates in the 40 KHz range and after passing through the flip-flop 63 provides a square wave signal of about 20 KHz on terminal 65. The second modulation signal on terminal 69 is conveniently derived by a divide by X divider from the first audio frequency signal at terminal 65. In this case the divider 66 divides by 2 divider so that the second audio frequency is 1/X times the frequency or one half the frequency of the first audio frequency. The bit signal is provided on terminal 70 and this may be conveniently derived from the divider 66 by the divider 67. This divider divides by Y which is any desired number. In the preferred embodiment shown this is a divide by 16 divider so that in the embodiment described above this bit lasts about 1.6 milliseconds. The divider 68 divides the bit signal by a factor of Z which may be of any desired numeral and in the above described embodiment this was a factor of 16 so that the word signal at the end of divider 68, in the above-identified example requires about 25 milliseconds. This means that about 20 words per second are repetitively transmitted by the transmitter 17.

The data selector 57 is connected to the programmable switch which establishes the externally programmable bits to be transmitted. FIG. 1 shows the nine pole switch 28 connected to the digital circuit 29. Let us assume that the pole of the switch connected to terminal 31 is closed and that the switch connected to the terminal 32 is open. The closed switch on terminal 31 establishes a logic one condition on that input of the gate 82 through the inverter 77. The switch open condition on terminal 32 means pull up resistor 76 will establish the input to the gate 83 to be a logic zero condition through the inverter 77. In the NOR gates, any input of a logic one yields the output at a logic zero and all logic zero inputs yield a logic one output. Thus with terminal 31 at a programmed one this yields a zero on the output of gate 82 and after passing through gate 75, it will again be inverted to be a logic one at the output 74 of the data selector 57.

Now passing briefly to the output decoder 58 one will note that the gates 98 and 99 are in series and both are NOR gates so that if there is a logic one on the output 74 of the data selector 57, then there will be a logic one on the terminal 100 at the output of the output decoder 58, when respectively, both gates 98 and 99 are enabled, as described below.

The output selector means 59 is a data multiplexer and acts like a single pole double throw switch to select either the first modulation frequency signal from the terminal 65 or the second modulation frequency signal from the terminal 69. Assume that at any given instant there is a logic one condition on the input 100 of gate 101. This logic one disables the gate 101 because it maintains the output thereof a logic zero. Thus the second modulation frequency from terminal 69 cannot pass through gate 101. The logic one condition on terminal 100 passes through the inverter 104 to be a logic zero on the input of gate 102. This logic zero enables gate 102 so that the alternating logic zero and logic one conditions at the first modulation frequency rate from the terminal 65 will pass through gate 102. With the logic zero from gate 101, this enables gate 103 so that the first modulation frequency from gate 102 passes through gate 103 and on to the output terminal 45.

Conversely if there is a logic zero condition on the terminal 100 this blocks the first modulation frequency and permits the second modulation frequency to pass. This is caused by the logic zero on terminal 100 enabling gate 101 so that the second modulation frequency from terminal 69 passes through gate 101. The logic zero condition on the terminal 100 passes through inverter 104 to become a logic one condition on the input of gate 102 to disable this gate maintaining a logic zero on the output thereof despite the input from terminal 65 changing at the first modulation frequency rate. The logic zero on the output of gate 102 enables gate 103 so that the output from gate 101, which is at the second modulation frequency rate, passes through this gate 103 and on to the output terminal 45. From the foregoing it will be seen that when a logic one condition, that is, a logic one is present on the terminal 100, then the high frequency first modulation signal is passed out of the digital circuit 29 and when a logic zero is on terminal 100, then the lower frequency second modulation signal is passed out of the digital circuit 29. The output driver 60 has sufficient output current to supply the current to the r.f. oscillator 18 of FIG. 1.

Returning now to the data selector 57, the divider 68 provides data select control signals on the terminals 71. These signals are time sequential control signals to control the data selector 57, which may be considered a time sequential multiplexer. These terminals have been labeled with the bit count available in a binary code, for example, at the bit count of one, the 1 terminal would go to a logic one. At the bit count of two, the 2 terminal would go to a logic one. At the bit count of three, the terminals 1 and 2 would both be a logic one, and so on through the binary code until at the count of 15 all terminals 1, 2, 4 and 8 would be at logic one condition. This bit count of 15 is decoded by the synchronization bit decoder 96 because it will be seen that when terminal 1, 2, 4 and 8 are high then the $\overline{1}, \overline{2}, \overline{4}$ and $\overline{8}$ terminals are all low hence this decoder gate 96 decodes this bit count of 15 since all four inputs being a logic zero, the output is a logic one hence resetting the output decoder 58. During the other 15 of the 16 bit counts however, the synchronous bit decoder 96 will have at least one input at a logic one to establish a zero on the reset terminal of the output decoder 58.

Gate 81 is used to decode the bit count of five and the bit counts of six through 13 are decoded by gates 82 through 89 respectively. In the above example it was assumed that the pole of the switch 28 connected to terminal 31 is closed and that connected to terminal 32 is open for a logic one and a logic zero condition on the respective inputs to these gates 82 and 83. Now with the connections to the data select control signal terminals 71 explained above, it will be seen that bit count 6 is decoded by gate 82 so that upon the bit count of 6 terminals 2 and 4 will be high hence the $\overline{2}$ and $\overline{4}$ terminals will be low and the 1 and 8 terminals will also be low enabling gate 82 for this count of six. Thus the only input terminal which is high during this count of six will be the input terminal coming from terminal 31 through inverter 77. This means that during the bit count of six when gate 82 is enabled the output from this gate 82 will be a logic zero.

During the bit count of seven the gate 83 will be enabled from the terminals 71 and the logic zero condition from terminal 32 through inverter 77 will establish a logic one output from this gate 83. The gate 75 time sequence multiplexes all of these signals from bit count five through thirteen so that whatever logic is on the input to the gates 81-89, because of the particular switch condition, will be passed to the output terminal 74 of the data selector 57 by double inversion to be the same logic one or zero condition.

As stated above, the reset terminal R on the output decoder 58 is usually a logic zero. Observe now the bit signal at the terminal 70. This bit signal consists of equal portions of logic one followed by a logic zero on the $\overline{Q}$ output of the divider 67. During this first half of the bit cycle the logic one on terminal 70 is applied to the $\overline{C}$ input of gate 99 thus disabling this gate for this first half of the bit cycle. Accordingly no matter what logic zero or logic one conditions appear on the output of the data selector 57 during this first half of the bit cycle nothing is passed through the disabled gate 99. This logic one condition during the first half of the bit cycle is also applied from terminal 70 to the set input terminal of gate 97 and disables this gate because it establishes a logic zero on the output thereof which is passed to one input of the three input gate 98. Thus this input is a logic zero and the reset input is also a logic zero under normal conditions. During this first half of the bit cycle the output from gate 99 is a zero and three logic zeros on the input of gate 98 establish a continuous logic one signal on terminal 100. As stated above this establishes the high frequency first modulation signal on the output at all times during the first half of each of the logic one or zero bit signals. This is shown at portions 107 and 108 of FIG. 2.

Next during the second half of the bit signal the terminal 70 changes from a logic one to a logic zero. This enables gate 99 so that the data from the data selector 57 may affect the output of digital circuit 29 during this last half of the cycle. This logic zero condition is also applied to the set input terminal S of the output decoder 58 and this is applied to one input of gate 97 which enables this gate. Thus during this second half of the bit cycle with terminal 70 at logic zero this has enabled both gates 97 and 99. Thus the logic one or logic zero condition from the input switches on terminals 31-39 will be passed at the appropriate bit counts through gate 75 and also through gates 99 and 98. As seen above, if bit count six is a programmed one on terminal 31, by closing the respective switch, it will be a logic one on terminal 74 and a logic one on terminal 100. This establishes the high first modulation frequency during the second half of the bit cycle. This is portion 109 of the graph of FIG. 2 and shows that for the logic one signal there is the high frequency first modulation signal during both the first and second halves of the bit. If there is an open switch or programmed zero condition on terminal 32 then during bit count seven this zero is passed and appears at terminal 74 and also at terminal 100. This logic zero condition establishes the lower frequency second modulation signal on the output of the modulator during the second half of the bit as shown in portion 110 of the graph of FIG. 2. Thus for the logic zero bit there is first the high frequency modulation signal 108 during the first half of the bit and the lower frequency second modulation signal 110 during the second half of the bit.

The synchronization bit decoder 96 decodes the bit count of 15 as stated above and at this time all four inputs of this gate 96 go to logic zero establishing the output at logic one. This is applied to the reset terminal R of the output decoder 58. This logic one on the input establishes a continuous zero on the output thereof at terminal 100. This establishes the lower frequency second modulation signal continuously for both first and second halves of that bit as shown at the graph 111 of FIG. 2. This is the continuous lower frequency second modulation signal to be the synchronization bit.

The gates 90, 91 and 92 are examples of one or more optional gates which may be provided to establish the internal programming or preamble. Gate 92 is connected to the data select control signal terminals 71 so that it decodes the bit count of four. It may have a fifth input internally connected to the operating voltage or to ground to provide either a logic one or a logic zero as desired for any particular count. In FIG. 3 the bit count of four has been shown as a logic zero as an example of internal programming. At the count of four all inputs of gate 92 go low establishing a high output which is one of the multiple inputs to the gate 75. Thus during the count of four gate 75 will have a logic zero output to establish the lower frequency modulation signal on the output of the digital circuit 29 at terminal 45. Accordingly, there is no need to include a fifth input to gate 92 so long as a logic zero input condition is desired. Gate 91 is shown with five inputs, four of which are connected to the terminals 71 to decode the bit count of three. At the count of three these four inputs go to a logic zero and thus the fifth input is that which controls during this count of three. This fifth input is connected to the internal operating voltage which is a logic one. Thus this logic one provides a logic zero on the output of gate 91 and a logic one on the output of gate 75. At the bit count of two there is no gate set to decode this count of two so there is no gate which will provide a logic zero input to the gate 75 hence this gate 75 will have a logic one output during this bit count of two. Thus it will be seen that during the count two and the count three the output of gate 75 is a logic one hence there really is no need to provide a gate such as gate 91 when a logic one condition on the output of gate 75 is desired, one might as well omit such gates. Accordingly, the gates for the bit count of zero, two and 14 have been omitted since it is desired in this particular example that they be a logic one condition.

Gate 90 has been shown as decoding the bit count of one, and this will operate similarly to gate 92 to apply a logic zero output from gate 75 on the bit count of one.

While the multiplexing function has been particularized as a simple data selector it is recognized that a shift register, for example, may alternatively be used.

The modulation signal from the digital circuit 29 is passed through the output terminal 45 and in FIG. 1 it will noted that this signal passes to the broad banding circuit 27. This circuit gives a broad band effect to the radio frequency carrier. In essence it acts like an FM modulation circuit. This broad banding circuit 27 is resonant within the modulation frequency range and preferably is resonant at a frequency intermediate the first and second modulation frequencies. In the present invention it has been found desirable to tune this resonant circuit to a frequency closer to the first modulation frequency than to the second modulation frequency, because in accordance with FIG. 2, one will note that the first modulation frequency is transmitted a greater percentage of the time than the second modulation frequency. In accordance with the above example of 20 and 10 KHz signals as the first and second modulation signals respectively, tuning the circuit 27 to a frequency of about 17 KHz has been found to give a broad band output to the carrier wave. If the carrier wave is about 300 megahertz, then the broad banding circuit 27 provides an FM band width of about 3½ megahertz. As this circuit 27 is tuned toward resonance of the first modulation frequency, this increases the impedance thereof so that there is less frequency modulation drive of the carrier resonant circuit 18 and therefore this narrows the FM band width from about 3.5 to about 2 megahertz. The value of this broad banding circuit is that it distributes the carrier energy throughout a wider band, lowering the level of the carrier at any discrete frequency, and increases the total amount of radiation from transmitter 17, to increase the range at which the transmitter 17 will affect the companion remotely controlled receiver. The transmitter is a low powered device operating, for example, at 9 volts at less than 1 milliampere, thus the broad banding circuit increases the effective range of the transmitter.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A modulated carrier wave transmitter comprising in combination;
    a carrier generator to generate a carrier wave;
    means establishing first and second different modulation frequencies;
    means establishing time sequential control signals;
    modulation means connected to modulate said carrier wave by said first and second modulation frequencies in first, second and third modulation patterns, comprising;
    first means connected to modulate said carrier wave with said first modulation frequency in accordance with said sequential control signals to establish said first modulation pattern of said carrier wave for at least one bit period, a bit period being the time period required for the transmission of one complete interval of the first, second or third modulation pattern,
    second means connected to modulate said carrier wave with said second modulation frequency in accordance with said sequential control signals to establish said second modulation pattern of said carrier wave for at least one bit period,
    and third means connected to modulate said carrier wave with said first modulation frequency and sequentially with said second modulation frequency in accordance with said sequential control signals to establish said third modulation pattern of said carrier wave for at least one bit period, the signal being transmitted containing all three modulation patterns.

2. A transmitter as set forth in claim 1, wherein said modulation frequency establishing means includes an oscillator and a flip-flop connected thereto to establish a square wave first modulation frequency.

3. A transmitter as set forth in claim 1, wherein said control signal establishing means includes a series of dividers to divide the frequency of one of said first and second modulation frequencies.

4. A transmitter as set forth in claim 1, wherein said modulation means includes gating means connected to establish modulation of said carrier wave selectively by said first and second modulation frequencies.

5. A transmitter as set forth in claim 1, wherein said modulation means includes a data selector,
    and programmable means connected to said data selector to select the modulation pattern in accordance with said programmable means and said time sequential control signals.

6. A transmitter as set forth in claim 5, wherein said data selector includes a plurality of gates enabled in sequence by said time sequential control signals to establish the modulation of said carrier wave by said first and second modulation frequencies.

7. A transmitter as set forth in claim 6, wherein said programmable means is connected to select one of said first and second modulation frequencies for each unit of time as established by said time sequential control signals.

8. A transmitter as set forth in claim 1, including means to broaden the band width of said carrier wave generator.

9. A transmitter as set forth in claim 8, wherein said band width broadening means includes a circuit operating at a center frequency in the range of said first and second modulation frequencies.

10. A transmitter as set forth in claim 9, wherein said band width broadening means is a circuit resonant to a frequency intermediate said first and second modulation frequencies.

11. A transmitter as set forth in claim 9, wherein said band width broadening means is a circuit resonant to a frequency intermediate said first and second modulation frequencies and closer to said first than to said second frequency.

12. An encoding transmitter comprising in combination;
an encoder having an output and including, oscillator means to generate a first audio frequency signal,
counter means connected to said oscillator to establish a second audio frequency signal, a bit signal and a set of data select control signals,
said second audio frequency signal being 1/x times the frequency of said first audio frequency,
said bit signal being 1/y times the frequency of said second audio frequency,
said set of data select control signals having Z number of output states, wherein X, Y and Z are numerals,
a data selector having a plurality of input channels, one output and control means connected to said data select control signals,
programmable means to program the input channels of said data selector,
a synchronization bit decoder connected to said counter means to decode one count of said Z number of output states,
output selector means connected to said oscillator and to said counter means to select said first and second audio signals on the output of said encoder,
and an output decoder having three input signals one each connected to said counter bit signal, said data selector and said sync bit decoder and having an output connected to said output selector means,
said bit signal comprising a first and a second complementary portion,
and said output decoder establishing first, second and third bit patterns on the output of said encoder with said first bit pattern comprising said first audio signal during both portions of a bit, said second bit pattern comprising said second audio signal during both portions of a bit, and said third bit pattern comprising one of said audio signals during said first portion and the other of said audio signals during said second portion of a bit,
one of said bit patterns being a synchronization bit another being a logic one bit and the third being a logic zero bit,
and a carrier generator modulated by said encoder output.

13. An encoding transmitter as set forth in claim 12, wherein said oscillator includes square wave shaping circuits to establish said first audio frequency signal as a square wave signal.

14. An encoding transmitter as set forth in claim 12, wherein said counter means includes flip-flops to successively divide in half the frequency of said oscillator means.

15. An encoding transmitter as set forth in claim 12, wherein said counter means includes a first divide by 2 divider to establish said second audio frequency, includes a divide by 16 divider to establish said bit signal, and includes dividers establishing 16 output states of said data select control signals.

16. An encoding transmitter as set forth in claim 12, wherein said programmable means includes multiple pole switch means connected to program the input channels of said data selector.

17. An encoding transmitter as set forth in claim 12, wherein said data selector is a Z:1 multiplexer connected to time division multiplex the signals from said programmable means to the output of said data selector.

18. An encoding transmitter as set forth in claim 12, wherein said synchronization bit decoder is a multiple input gate having inputs from said data select control signals of said counter means to have an output to said output decoder upon decoding said one count of said Z number of output states.

19. An encoding transmitter as set forth in claim 12, wherein said output decoder includes a steering flip-flop connected to be set by said bit signal and overridden by a reset signal from said synchronization bit decoder.

20. An encoding transmitter comprising in combination;
an encoder having an output and including, means to generate a first and a second audio frequency and a bit signal,
said second audio frequency being 1/x times the frequency of said first audio frequency,
said bit signal being 1/y times the frequency of said second audio frequency, wherein X and Y are numerals,
said bit signal comprising first and second complementary portions,
and means including an output decoder connected to said generator means and establishing first, second and third bit patterns on the output of said encoder with said first bit pattern comprising said first audio frequency during both portions of a bit, said second bit pattern comprising said second audio frequency during both portions of a bit, and said third bit pattern comprising one of said audio frequencies during said first portion and the other of said audio frequencies during said second portion of a bit,
one of said bit patterns being a synchronization bit another being a logic one bit and the third being a logic zero bit;
and a carrier generator modulated by said encoder output.

21. A transmitter as set forth in claim 20, including a data selector having a plurality of input channels and an output,
programmable means to program the channels of said data selector,
and means connecting the output of said data selector to said output decoder.

22. A transmitter as set forth in claim 20, wherein said generator means includes counter means connected to receive said first audio frequency and to establish said second audio frequency and said bit signal as divided outputs thereof.

23. A transmitter as set forth in claim 22, wherein said counter means establishes a set of data select control signals, said set of data select control signals having Z number of output states wherein Z in a numeral, a data selector having a plurality of input channels, one output and control means connected to said data select control signals, programmable means to program the input channels of said data selector, output selector means connected to said generator and said counter means to select said first and second audio signals on the output of said encoder, and means connecting the output of said output decoder to said output selector means.

* * * * *